(12) United States Patent
Hsien

(10) Patent No.: US 7,044,621 B2
(45) Date of Patent: May 16, 2006

(54) LAMP SEAT OF A HAND TOOL

(76) Inventor: Chih-Ching Hsien, 235 Chung - Ho Box 8-24, Taipei (TW)

( * ) Notice: Subject to any disclaimer, the term of this patent is extended or adjusted under 35 U.S.C. 154(b) by 82 days.

(21) Appl. No.: 10/851,957

(22) Filed: May 24, 2004

(65) Prior Publication Data

US 2005/0259429 A1   Nov. 24, 2005

(51) Int. Cl.
  *F21V 21/06* (2006.01)
(52) U.S. Cl. ....................... 362/389; 362/396
(58) Field of Classification Search ............... 362/389, 362/119; 248/689; 224/580, 929
  See application file for complete search history.

(56) References Cited

U.S. PATENT DOCUMENTS 6,951,409 B1 * 10/2005 Hsien .......................... 362/191

2003/0106919 A1 * 6/2003 Chuang ...................... 224/420

* cited by examiner

*Primary Examiner*—Renee Luebke
*Assistant Examiner*—Leah S Lovell

(57) ABSTRACT

A lamp seat of a hand tool comprises a clamping seat; an upper end of the clamping seat having a clamping portion formed by for posts; a lower side of the cambered surface having a ball shape groove; a receiving seat; a upper side of the cambered surface being protruded with a combining portion; a top of the combining portion having a ball-like shape corresponding to the ball shape groove of the clamping seat; a bottom side of the receiving seat being formed with a first through hole and a second through hole. Thus, the lamp seat can carry a hand tool and a flashlight at the same time. Moreover, a clamping seat of the present invention can rotate with respect to the receiving seat through a wide range.

1 Claim, 4 Drawing Sheets

LAMP SEAT OF A HAND TOOL

FIELD OF THE INVENTION

The present invention relates to lamp seat of a hand tool for carrying a hand tool and a flashlight at the same time. Moreover, a clamping seat of the present invention can rotate with respect to the receiving seat through 360 degrees.

BACKGROUND OF THE INVENTION

In the operation of hand tools, it is often necessary to use a flashlight to light up the working place so that the operator can operate the hand tool clearly.

Thus there is a necessity for a device which can retain a hand tool and a flashlight so that they can be carried at the same time. Some prior arts provide such functions. However, in these prior arts, the lighting device is directly adhered within the hand tool. If the lighting device is destroyed, it is difficult to repair it. However, most of the hand tool has no lighting function and thus the user must carry a lighting device, but it also inconvenient to carry the hand tool and lighting device individually.

SUMMARY OF THE INVENTION

Accordingly, the primary object of the present invention is to provide a lamp seat of a hand tool for carrying a hand tool and a flashlight at the same time. Moreover, a clamping seat of the present invention can rotate with respect to the receiving seat through 360 degrees.

To achieve above objects, the present invention provides lamp seat of a hand tool which comprises a clamping seat, an upper end of the clamping seat having a clamping portion formed by four posts; a lower end of the clamping seat having a 1 cambered surface; a center of the first cambered surface having a ball shape groove; a receiving seat; an upper side of the receiving seat having a second cambered surface; a center of the cambered surface being protruded with a combining portion; a top of the combining portion having a ball-like shape corresponding to the ball shape groove of the clamping seat; a bottom side of the receiving seat being formed with a first through hole and a second through hole; each of the first through hole and second through hole having C shape cross sections; each of the first through hole and second through hole passing through the center of the bottom side of the receiving seat; the first through hole having a cross section larger than that of the second through hole; an inner wall of the first through hole being formed with a tooth portion and an inner wall of the second through hole being formed with a tooth portion.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
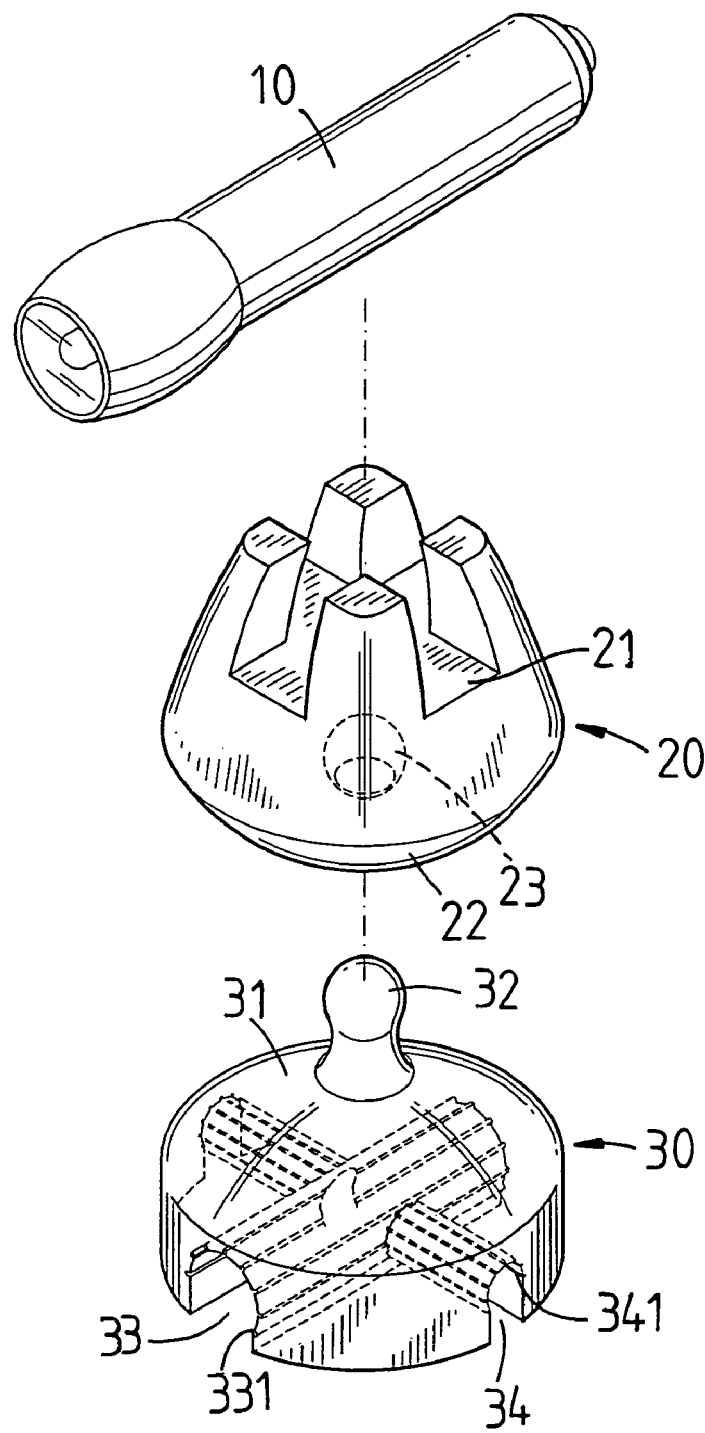
FIG. 1 is an exploded perspective view of the lamp seat of a hand tool of the present invention.
Figure 2:
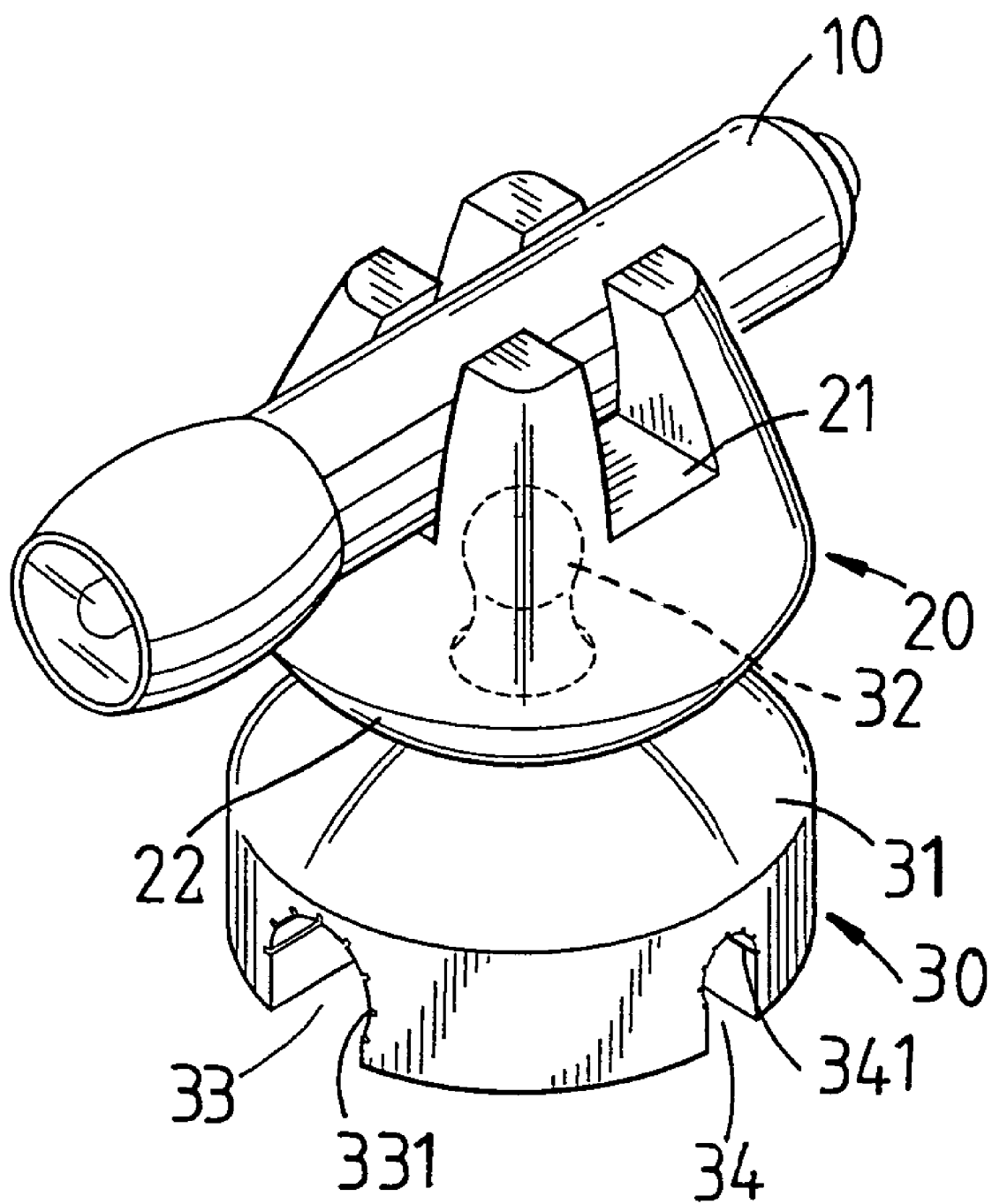
FIG. 2 is a perspective view of the present invention.
Figure 3:
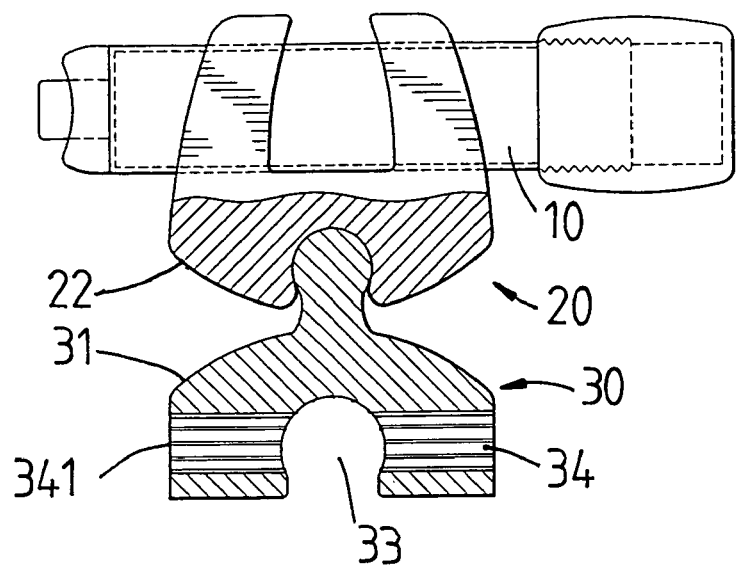
FIG. 3 is a partial cross section view of the lamp seat of a hand tool according to the present invention.
Figure 4:
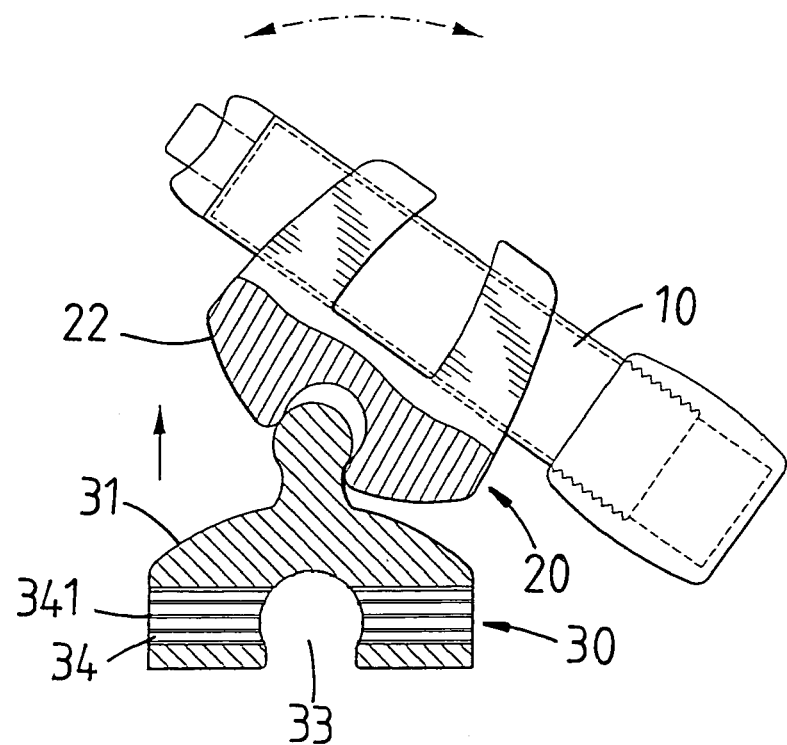
FIG. 4 is another partial cross section view of the lamp seat of a hand tool according to the present invention.

With reference to FIGS. 1 and 2, the lamp seat of a hand tool of the present invention mainly includes an illuminating device 10 and a receiving seat 30.

The illuminating device 10 may be realized by a long cylindrical flashlight.

An upper end of the clamping seat 20 has a clamping portion 21 formed by four posts. A lower end of the clamping seat 20 has a cambered surface 22. A center of the bottom side of the cambered surface 22 has a ball shape groove 23.

The receiving seat 30 is an approximate round disk. An upper side of the receiving seat 30 has a cambered surface 31. A center of the cambered surface 31 is protruded with a combining portion 32. A top of the combining portion 32 has a ball-like shape corresponding to the ball shape groove 23 of the clamping seat 20. A bottom side of the receiving seat 30 is formed with a first through hole 33 and a second through hole 34. Each of the first through hole 33 and second through hole 34 has C shape cross sections. Each of the first through hole 33 and second through hole 34 passes through the center of the bottom side of the receiving seat 30. The first through hole 33 has a cross section larger than that of the second through hole 34. The first through hole 33 serves for receiving sleeve form spanners, ratchet spanners, etc. and the second through hole 34 serves for receiving screw openers or other hand tools. An inner wall of the first through hole 33 is formed with a tooth portion 331 and an inner wall of the second through hole 34 is formed with a tooth portion 341.

With reference to FIG. 2, in assembly, the illuminating device 10 is placed into the clamping portion 21 of the clamping seat 20. Then the combining portion 32 of the receiving seat 30 is engaged to the ball shape groove 23 of the clamping seat 20 so that the clamping seat 20 can rotate through 360 degrees. In the present invention, the clamping seat 20 has a cambered surface 22 and the receiving seat 30 has a cambered surface 31. Thereby, the clamping seat 20 can adjust with a larger extent.

Figure 5:
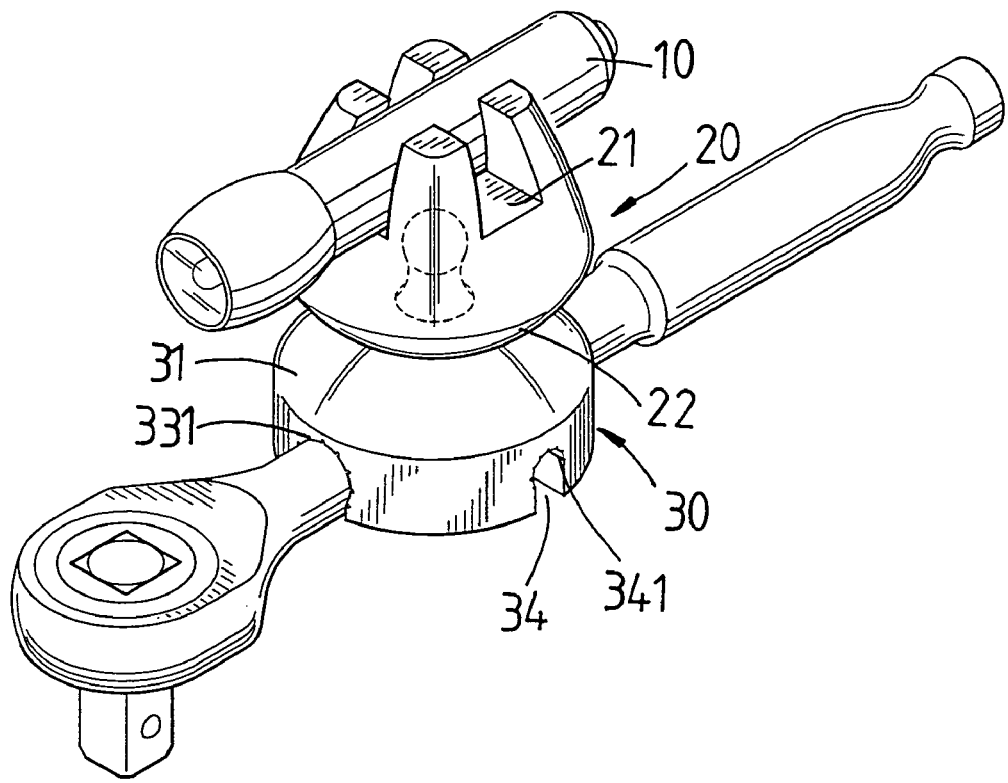
FIG. 5 shows the use of the lamp seat of a hand tool of the present invention.
Figure 6:
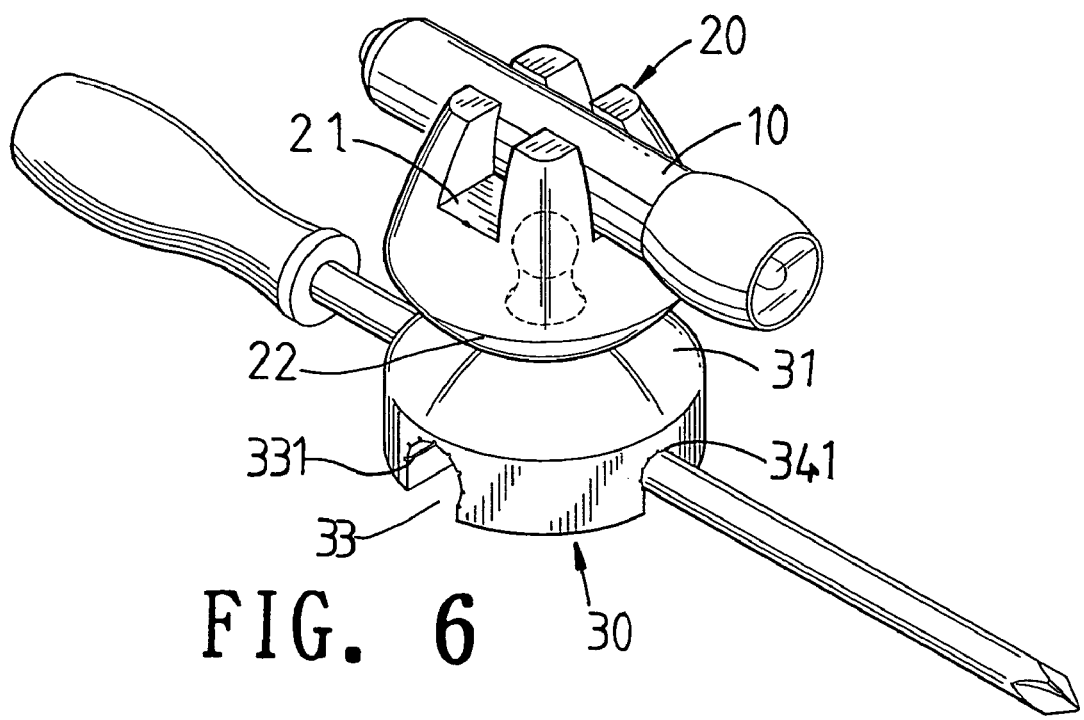
FIG. 6 shows another use of the lamp seat of a hand tool according to the present invention.

Referring to FIGS. 5 and 6, in use of the present invention, the first through hole 33 serves for receiving sleeve form spanners, ratchet spanners, etc. The handle of the tool is placed in the through hole and the tooth portion 331 serves to provide an elastic expanding force so that the handle of the tool can be taken out easily. The second through hole 34 serves for receiving screw openers or other hand tools. The tooth portion 341 has the same effect like the tooth portion 331. The illuminating device 10 can be received in the clamping portion 21 as illustrated in FIGS. 5 and 6.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A lamp seat of a hand tool comprising:

a clamping seat, an upper end of the clamping seat having a clamping portion formed by four posts; a lower end of the clamping seat having a cambered surface; a center of the first cambered surface having a ball shape groove;

a receiving seat; an upper side of the receiving seat having a second cambered surface; a center of the cambered surface being protruded with a combining portion; a top of the combining portion having a ball-like shape corresponding to the ball shape groove of the clamping seat; a bottom side of the receiving seat being formed with a first through hole and a second through hole; each of the first through hole and second through hole having C shape cross sections; each of the first through hole and second through hole passing through the center of the bottom side of the receiving seat; the first through hole having a cross section larger than that of the second through hole; an inner wall of the first through hole being formed with a tooth portion and an inner wall of the second through hole being formed with a tooth portion.

* * * * *